US008064713B2

(12) United States Patent
Kuno (10) Patent No.: US 8,064,713 B2
(45) Date of Patent: Nov. 22, 2011

(54) DATA PROCESSING DEVICE THAT EXECUTES RETINEX PROCESSING

(75) Inventor: Masashi Kuno, Obu (JP)

(73) Assignee: Brother Kogyo Kabushiki Kaisha, Nagoyo-shi, Aichi-ken (JP)

( * ) Notice: Subject to any disclaimer, the term of this patent is extended or adjusted under 35 U.S.C. 154(b) by 950 days.

(21) Appl. No.: 11/710,912

(22) Filed: Feb. 27, 2007

(65) Prior Publication Data

US 2007/0201758 A1 Aug. 30, 2007

(30) Foreign Application Priority Data

Feb. 27, 2006 (JP) ................. P2006-050597

(51) Int. Cl.
*G06K 9/40* (2006.01)
(52) U.S. Cl. ........................................ 382/260
(58) Field of Classification Search .............. None
See application file for complete search history.

(56) References Cited

U.S. PATENT DOCUMENTS

| 5,790,704 | A | 8/1998 | Rao et al. |
| 6,529,270 | B1 * | 3/2003 | Bills ............................ 356/237.2 |
| 6,919,924 | B1 | 7/2005 | Terashita |
| 6,947,176 | B1 | 9/2005 | Kubo et al. |
| 7,038,810 | B1 | 5/2006 | Yamazoe et al. |
| 2003/0020709 | A1 * | 1/2003 | Naegle et al. ................. 345/419 |
| 2004/0091164 | A1 | 5/2004 | Sakatani et al. |
| 2004/0183006 | A1 * | 9/2004 | Reilly et al. ................... 250/282 |
| 2004/0217270 | A1 * | 11/2004 | Publicover et al. ........... 250/234 |

FOREIGN PATENT DOCUMENTS

| JP | H08-265567 A | 10/1996 |
| JP | 11-331596 | 11/1999 |
| JP | 2001-024872 A | 1/2001 |
| JP | 2001-078025 | 3/2001 |
| JP | 2004-165840 | 6/2004 |
| JP | 2004-239870 A | 8/2004 |
| JP | 2005-167831 A | 6/2005 |

OTHER PUBLICATIONS

Weiss, I.; , "Noise resistant projective and affine invariants," Computer Vision and Pattern Recognition, 1992. Proceedings CVPR '92., 1992 IEEE Computer Society Conference on , vol., No., pp. 115-121, Jun. 15-18, 1992 doi: 10.1109/CVPR.1992.223218 URL: http://ieeexplore.ieee.org/stamp/stamp.jsp?tp=&arnumber=223218&isnumber=5817.*

Japan Patent Office, Office Action for Patent Application No. JP 2006-050597 (counterpart to above-captioned patent application), mailed Dec. 21, 2010.

* cited by examiner

*Primary Examiner* — Brian Werner
*Assistant Examiner* — Nirav G Patel
(74) *Attorney, Agent, or Firm* — Baker Botts L.L.P.

(57) ABSTRACT

When a logarithmic spiral function curve exists at a position specified by variables, a filter coefficient corresponding to the position is obtained through calculation using Gaussian function stored in a Gaussian function memory, and the filter coefficient is stored in a filter coefficient memory in association with the position specified by the variables. Retinex processing is executed on original image data using the filter coefficients stored in the filter coefficient memory.

14 Claims, 10 Drawing Sheets

DATA PROCESSING DEVICE THAT EXECUTES RETINEX PROCESSING

CROSS REFERENCE TO RELATED APPLICATION

This application claims priority from Japanese Patent Application No. 2006-050597 filed Feb. 27, 2006. The entire content of this priority application is incorporated herein by reference.

TECHNICAL FIELD

The disclosure relates to an image processing program and an image processing device capable of speeding up a filtering processing in Retinex processing while preventing the deterioration in image quality.

BACKGROUND

When a subject is photographed against light, an image of the subject becomes an ambiguous backlit image. This backlit image has such low brightness and contrast that the details thereof are difficult to discriminate. Overexposure or underexposure, blurring and out-of-focus in shooting an object, noise, or insufficient light intensity also may be cause of degradation in image quality. However, quality of such poor-quality images can be improved by executing processing on image data for enhancing the brightness and contrast thereof. Retinex processing has been known as one of such processing to improve image quality.

In Retinex processing, data of a high image quality portion is maintained, while image quality of a low image quality portion is improved. In Retinex processing, each pixel data of the original image is corrected to a value in which pixel data of surrounding pixels are reflected, using a Gaussian filter. Then, reference component data of the original image is calculated from natural logarithm of the corrected pixel data. Illuminance component data is calculated by dividing the pixel data of the original image by the pixel component of the original image. That is, the original image is divided into reference component and illuminance component. A processing, such as a gamma correction, for correcting brightness and contrast, is performed on the illuminance component. Thereafter, the corrected illuminance component and the reference component are composed to generate image data in which the low quality portion, such as a backlit image portion, has been improved in image quality in comparison to the original image.

However, in a filtering processing executed in Renetix processing, it is necessary to perform convolution operations. That is, density values of pixels of original image data are multiplied by corresponding filter coefficients to obtain products, and the sum of the products is obtained.

Figure 1A:
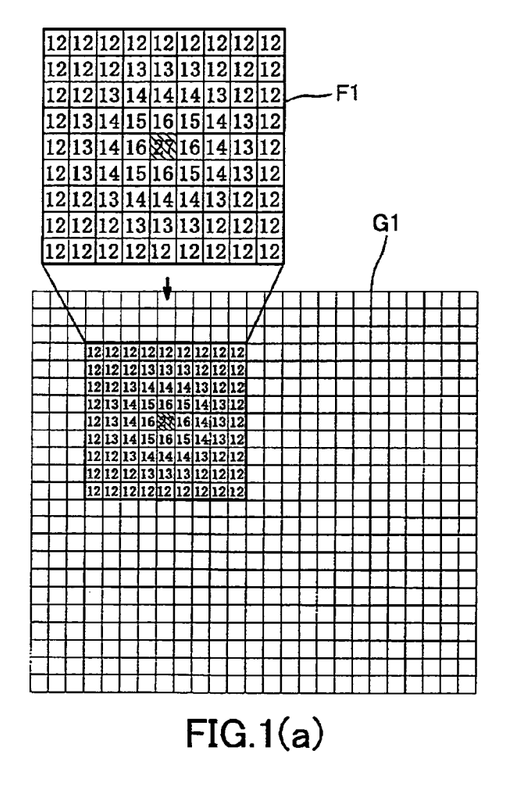
FIG. 1(a) is a schematic view showing the configuration of a conventional filter.

For example, when an image G1 shown in FIG. 1(a) is subjected to a filtering processing using a filter F1 having a scale of 9×9=81 pixels, 81 multiplications and 80 additions have to be performed. That is, a density value of each pixel in the image G1 is multiplied by a filter coefficient in the corresponding pixel of the filter F1, and the resultant products are added up. The center pixel of the filter F1 corresponds to a pixel of the image G1 subjected to the filtering processing. In this example, the filter coefficients take the values of 12 to 27.

Figure 1B:
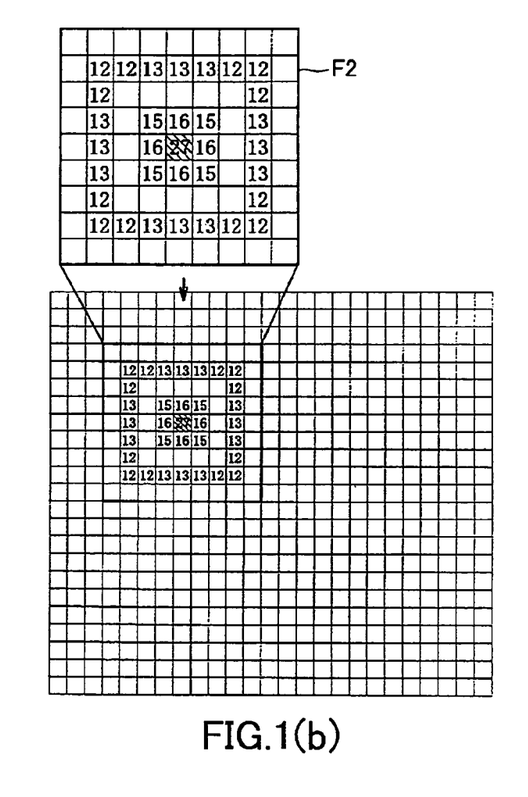
FIG. 1(b) is a schematic view showing the configuration of another conventional filter.

Since the convolution operation take much time, there has been proposed to thin out rows and/or columns of elements (coefficients) in the filter F. For example, a filter F2 shown in FIG. 1(b) is created by thinning out the filter coefficients in pixels on the outermost and inner peripheries. By reducing the number of elements in this manner, the number of times of the convolution operation is reduced, thereby speeding up the filtering processing.

SUMMARY

It is an object of the invention to provide an image processing program and an image processing device capable of speeding up a filtering processing and of preventing the deterioration in image quality.

In order to attain the above and other objects, the invention provides a storage medium storing a set of program instructions executable on a computer and usable for controlling the computer to execute Retinex processing. The instructions includes performing convolution operation between a plurality of filter coefficients and density values of pixels of an original image corresponding to positions of the filter coefficients. The filter coefficients have been set based on a polar coordinate function having an origin located at a position corresponding to a subject pixel of the original image and exist within a predetermined area corresponding to an area around the subject pixel.

There is also provided a storage medium storing a set of program instructions executable on a computer and usable for controlling the computer to execute Retinex processing. The instructions include performing convolution operation between a plurality of filter coefficients and density values of pixels of an original image corresponding to positions of the filter coefficients. The filter coefficients exist in random positions within a predetermined area corresponding to an area around a subject pixel of the original image.

There is also provided a data processing device that executes Retinex processing. The data processing device includes a calculation unit that performs convolution operation between a plurality of filter coefficients and density values of pixels of an original image corresponding to positions of the filter coefficients. The filter coefficients have been set based on a polar coordinate function having an origin located at a position corresponding to a subject pixel of the original image and exist within a predetermined area corresponding to an area around the subject pixel.

There is also provided a data processing device that executes Retinex processing. The data processing device includes a calculation unit that performs convolution operation between a plurality of filter coefficients and density values of pixels of an original image corresponding to positions of the filter coefficients. The filter coefficients exist in random positions within a predetermined area corresponding to an area around a subject pixel of the original image.

BRIEF DESCRIPTION OF THE DRAWINGS

Illustrative embodiments in accordance with the invention will be described in detail with reference to the following figures wherein.

DETAILED DESCRIPTION

Figure 2:
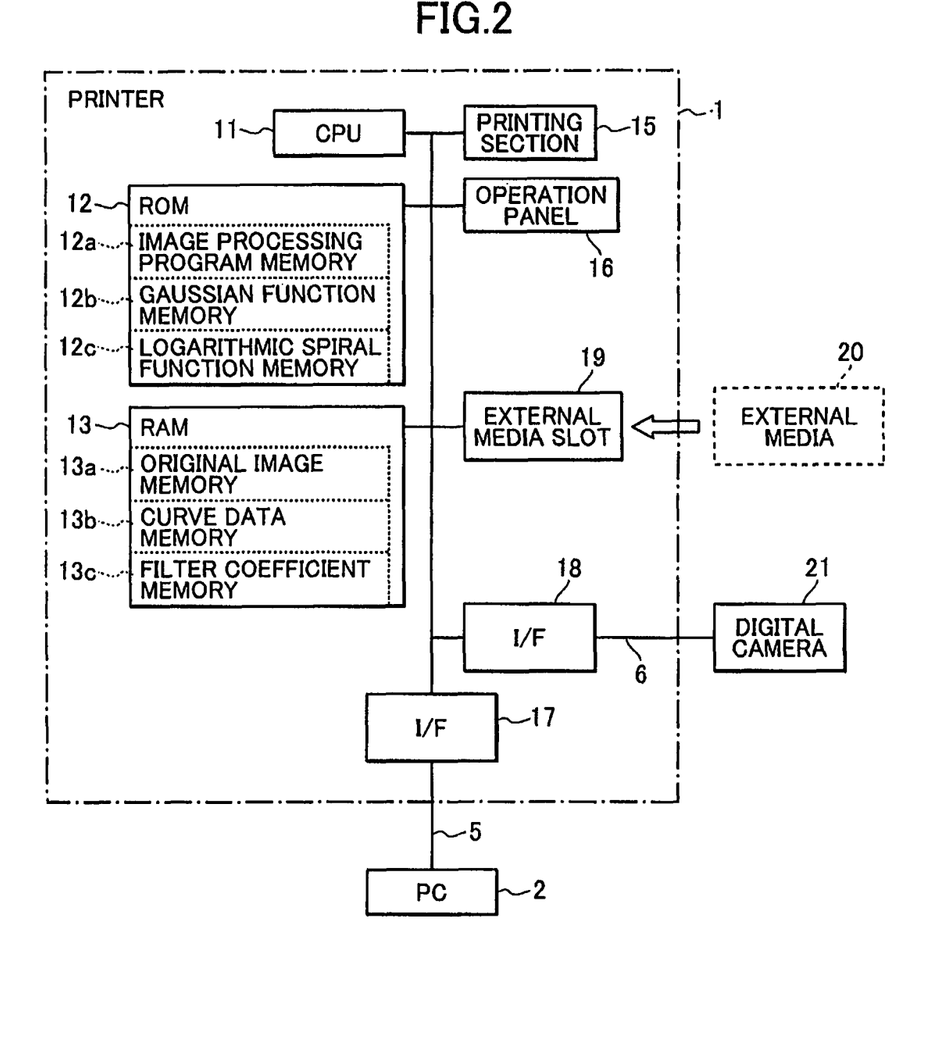
FIG. 2 is a block diagram showing an electric configuration of a printer according to an embodiment of the invention.

A preferred embodiment of the invention will be described with reference to the accompanying drawings. FIG. 2 is a block diagram showing an electric configuration of a printer 1 according to the embodiment.

As shown in FIG. 2, the printer 1 includes a CPU 11, a ROM 12, a RAM 13, a printing section 15, and an operation panel 16. The printing section 15 has a print head and performs printing on a printing medium, such as a paper sheet. The operation panel 16 has an operating section, such as numeric keys, for enabling a user to input values, such as the size of an output image.

The printer 1 further includes an interface (I/F) 17 connectable to a personal computer (PC) 2 via a cable 5, an I/F 18 connectable to a digital camera 21 via a cable 6, and an external media slot 19. An external media 20 can be detachably mounted in the external media slot 19. The external media 20 may be a flash memory, such as a SD memory card and a memory stick, for example. In recent years, a Universal Serial Bus (USB) is used as a communication method of the I/Fs 17 and 18.

Therefore, the printer 1 can receive image data from the PC 2 via the cable 5 and the I/F 17 and image data from the digital camera 21 via the cable 6 and the I/F 18. The printer 1 can also receive image data from the external media 20 mounted in the external media slot 19.

The CPU 11 is for performing overall control of the printer 1. The ROM 21 is for storing various programs executed by the CPU 11 and fixed values used when such programs are executed. The ROM 21 includes an image processing program memory 12a that stores an image processing program, a Gaussian function memory 12b that stores Gaussian function, and a logarithmic spiral function memory 12c that stores logarithmic spiral functions.

The image processing program stored in the image processing program memory 12a is for executing Retinex processing on image data received from the PC 2, the digital camera 21, or the external media 20, thereby correcting a low image quality area, such as a backlit image part, of the image data.

The logarithmic spiral functions stored in the logarithmic spiral function memory 12c are for specifying pixel positions in a filter, and only the convolution operation is performed using filter coefficients in the specified pixel positions in Retinex processing. Details will be described later.

The RAM 13 has a working area for storing various registers required for the programs executed by the CPU 1, and a temporary area for storing data temporarily during various processing. The RAM 13 includes an original image memory 13a for storing original image data received from the PC 2, the digital camera 21, or the external media 20 via the I/F 17, the I/F 18, or the external media slot 19, a curve data memory 13b for storing coordinate data representing a curve calculated using the logarithmic spiral functions stored in the logarithmic spiral function memory 12c, and a filter coefficient memory 13c for storing filter coefficients corresponding to the pixel positions specified by the logarithmic spiral functions.

The original image data and an output image data are both composed of a RGB value which falls within a range of 0 to 255. The RGB value indicates a R-value representing red, a G-value representing green, and a B-value representing blue. Since each of various colors are created by a combination of red, green, and blue, which are the three primary colors of light, the color (hue or gray-scale) of each pixel of the image data is expressed by a combination (RGB value) of the R-value, the G-value, and the B-value. The larger is the RGB value, the higher becomes the luminance (brightness).

Next, a filtering processing executed by the CPU 11 in Retinex processing will be described with reference to FIG. 3(a) to 3(c).

Figure 3A:
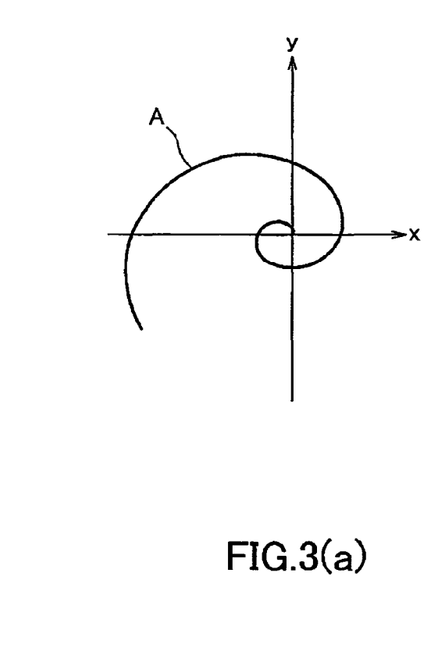
FIG. 3(a) shows a logarithmic spiral function curve.

FIG. 3(a) is a view showing a logarithmic spiral curve A of one of the logarithmic spiral functions stored in the logarithmic spiral function memory 12c. This logarithmic spiral function is represented by the following equations:

$$r = a \times e^{b\theta}$$

$$x = r\cos(\theta)$$

$$y = r\sin(\theta)$$

where "a" and "b" are constants, "r" is a radius (moving radius), "θ" is an angle of deviation, and "x" and "y" respectively represent the transverse coordinate and the longitudinal coordinate on an coordinate system.

Figure 3B:
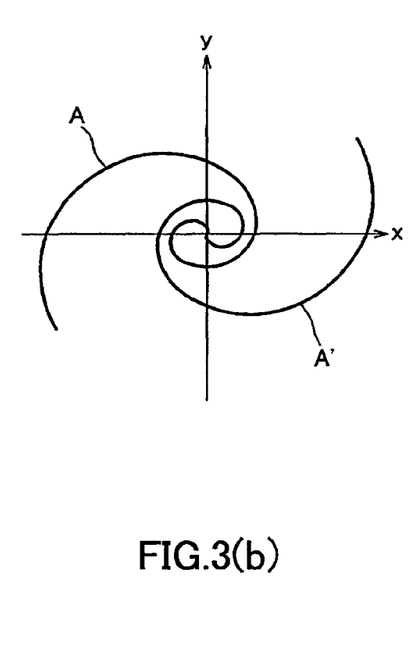
FIG. 3(b) shows two logarithmic spiral function curves.

FIG. 3(b) is a view showing a logarithmic spiral curve A' of the other of the logarithmic spiral functions stored in the logarithmic spiral function memory 12c and the logarithmic spiral curve A. The logarithmic spiral curve A' is identical to the logarithmic spiral curve A but is rotated by 180 degrees about the origin of coordinates. By using a plurality of logarithmic spiral functions in this manner, positions where the convolution operation is performed are specified equally in an area surrounding the subject pixel (surrounding area), thereby enabling the prevention of deterioration in image quality.

Figure 3C:
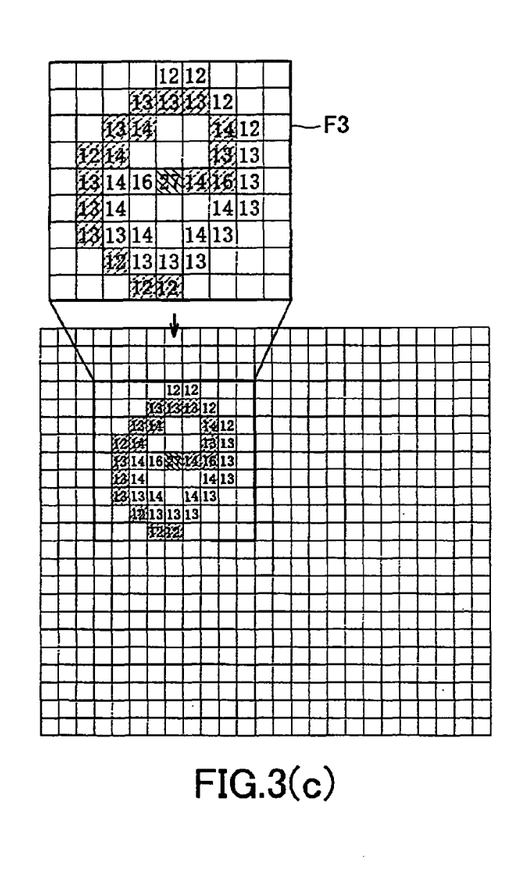
FIG. 3(c) is a schematic view showing a filter created using logarithmic spiral functions.

FIG. 3(c) is a view showing a filter F3 with filter coefficients at positions specified by the logarithmic spiral curves A and A' shown in FIG. 3(b). In FIG. 3(c), the filter coefficients at the positions specified by one of the logarithmic spiral curves A and A' are shaded, and the filter coefficients corresponding to the positions specified by the other logarithmic spiral function A or A' is not shaded.

Figure 4:
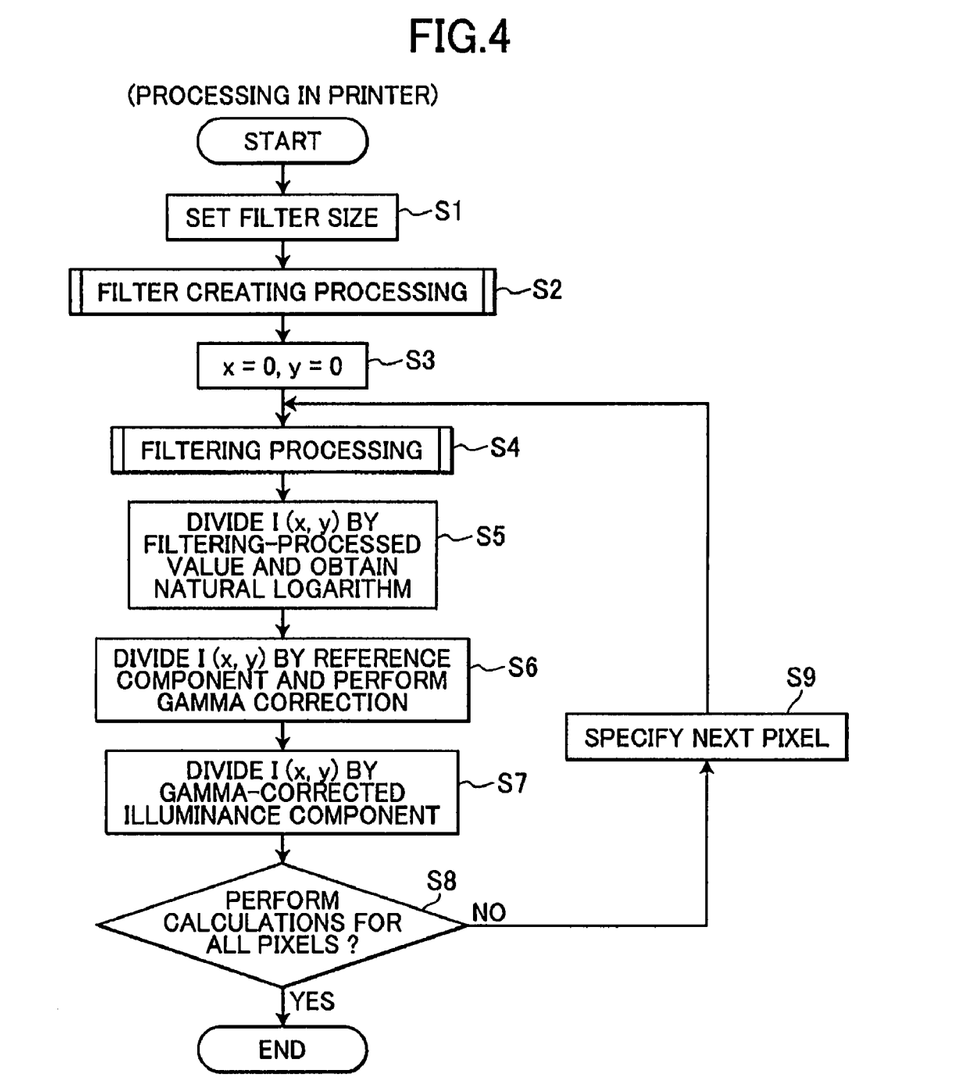
FIG. 4 is a flowchart representing Retinex processing according to the embodiment of the invention.

Next, Retinex processing executed in the printer 1 of the present embodiment will be described with reference to FIGS. 4 to 6. FIG. 4 is a flowchart representing Retinex processing executed by the CPU 11. Retinex processing is for correcting the backlit portion or the like of original image (for improving image quality, for enhancing contrast and brightness). In the following description, it is assumed that original image data on which Retinex processing is to be executed have been specified by a user and stored in the original image memory 13*b* through a user operation.

In Retinex processing, first, the size of a filter is set (S1). The filter is usually circular, and the radius thereof is obtained by, for example, dividing the number of pixels on the narrow side of an original image by a predetermined number (for example, 20). Even if the filter is circular, the size of the filter is expressed by the size of a square including the circle. Thus, in this embodiment, the filter has the size of n×n elements.

Then, a filter creating processing is executed to create a filter having the set size (S2). The filter creating processing will be described later with reference to FIG. 5.

Then, a variable x and a variable y are both set to 0 (x=0, y=0) (S3). The variable x identifies a transverse coordinate of a subject pixel of the original image data, and the variable y represents the longitudinal coordinate thereof. In the following descriptions, I (x, y) denotes a density value of the subject pixel. Then, subsequent processes in S4 to S7 are executed for all the pixels of the original image data while sequentially increasing the variables x and y.

That is, a filtering processing is executed on the target pixel identified by the variables x and y, using the filter created in S2 (S4), thereby obtaining a peripheral average luminance of the target pixel. The filtering processing will be described later with reference to FIG. 6.

Then, the density value I (x, y) of the target pixel is divided by the peripheral average luminance obtained in S4, and a reference component, which is a natural logarithm of the divided value, is obtained (S5). An illuminance component is obtained by dividing the density value I (x, y) by the reference value, and gamma correction is performed on the illuminance component (S6). The density value I (x, y) is divided by the gamma-corrected value (S7).

It is determined whether or not the processes in S4 to S7 have been executed for all the pixels of the original image data (S8). If not (S8: No), then the variable x or y is incremented to specify a next pixel as a target pixel (S9). Then, the process returns to S4. On the other hand, if so (S8: Yes), then Retinex processing is ended.

Next, the filter creating processing executed S2 of FIG. 4 will be described with reference to the flowchart of FIG. 5. First, longitudinal coordinates y corresponding to transverse coordinates x are calculated using the logarithmic spiral functions stored in the logarithmic spiral function memory 12*c* while sequentially increasing "e" from 0 degree, thereby creating curve data, which is stored in the curve data memory 13*b* (S11).

Then, variables i and j are set to 0 (i=0, j=0) (S12). The variables i and j are for specifying a position of one of the n×n elements of the filter. Subsequently, it is determined whether or not a curve represented by the curve data stored in the curve data memory 13*b* exists in the position specified by the variables i and j (S13). This determination can be made by obtaining the value x corresponding to the variable i and the value y corresponding to the variable j, and by determining whether or not the value y corresponding to the value x stored in the curve data memory 13*b* is identical to the value y corresponding to the variable J. When the value y corresponding to the value x is identical to the value y corresponding to the variable j, this means that the curve exists in the position specified by the variables i and j. On the other hand, when the value y corresponding to the value x is not identical to the value y corresponding to the variable j, this means that the curve does not exist in the position specified by the variables i and j.

If a positive determination is made in S13 (S13: Yes), then, a filter coefficient corresponding to the position specified by the variables i and j is obtained through calculation using the Gaussian function stored in the Gaussian function memory 12*b* (S14). The obtained filter coefficient is stored in the filter coefficient memory 13*c* in association with the position specified by the variables i and j (S15), and the process proceeds to S16. On the other hand, if a negative determination is made in S13 (S13: No), then the process proceeds directly to S16. In S16, it is determined whether or not both the variables i and j have reached the value of n. In other words, it is determined whether or not the processes in S13 to S15 have been completed for all the n×n elements of the filter. If not (S16: No), the variable i or j is incremented to specify the position of the next element (S17), and the process returns to S13. On the other hand, if so (S16: Yes), then the filter creating processing is ended.

Next, the filtering processing executed in S4 of FIG. 4 will be described with reference to a flowchart of FIG. 6. First, variables i and j are set to 0 (i=0, j=0) (S21). Next, it is determined whether or not a filter coefficient in association with a position specified by the variables i and j is stored in the filter coefficient memory 13*c* (S22). If so (S22: Yes), then the filter coefficient is multiplied by a density value of a pixel of the original image data corresponding to the position specified by the variables i and y, thereby obtaining a multiplication value (S23). Then, the multiplication value is accumulated (S24), and the process proceeds to S25.

On the other hand, if a negative determination is made in S22 (S22: No), then the process directly proceeds to S25. In S25, it is determined whether or not the variables i and j have reached the value n, thereby determining whether or not the processes from S22 to s24 have been completed for all the n×n elements of the filter. If not (S25: No), then the variable i or j is incremented to specify the position of the next element (S26), and the process returns to S22. On the other hand, if so (S25: Yes), then the filtering processing is ended.

As described above, according to the present embodiment, the number of the filter coefficients is reduced, thereby simplifying the convolution operation. Also, because the positions of filter coefficients around a target pixel are specified by using the logarithmic spiral functions with the origin located in the position corresponding to the target pixel, the filter coefficients does not form a straight line. This prevents generation of pseudo contour in the original image.

That is, if the filter coefficients are thinned linearly as shown in FIG. 1(*b*), the number of times of the convolution operation can be reduced to speed up the filtering processing. However, when a straight line or the like exists in the original image, pseudo contour may be generated as a result of Retinex processing, leading to the deterioration in image quality.

More specifically, FIGS. 7(*a*) and 7(*b*) shows an original image G2 that includes polka dots in lattice-like arrangement and a filter F4 with filter coefficients arranged in a radial pattern. The filtering processing is executed while moving sequentially the position of the filter F4 over the original image G2. In FIG. 7(*a*), the lines of the filter coefficients coincide substantially with the positions of the polka dots of the original image G2. In FIG. 7(*b*), the filter F4 is slightly displaced from the position of FIG. 7(*a*), and the straight lines of the filter coefficients are slightly displaced from the polka dots. As a result, the average brightness in FIG. 7(*a*) and that in FIG. 7(*b*) calculated using the filter F4 may largely differ from each other.

Figure 7A:
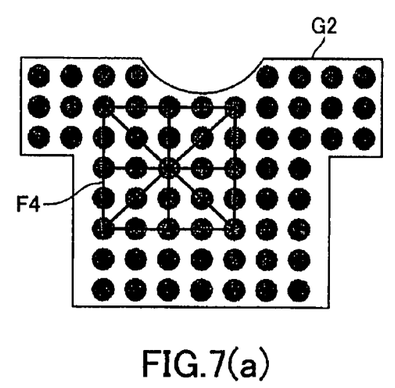
FIG. 7(a) is a schematic view showing a conventional filter with an original image.
Figure 7B:
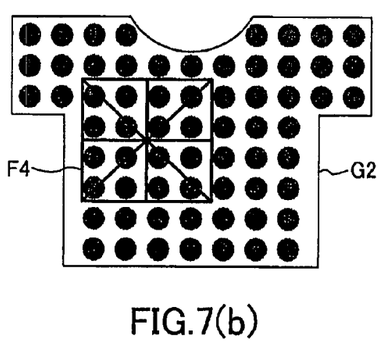
FIG. 7(b) is a schematic view showing the conventional filter in FIG. 7(a) slightly displaced from the position of FIG. 7(a)
Figure 7C:
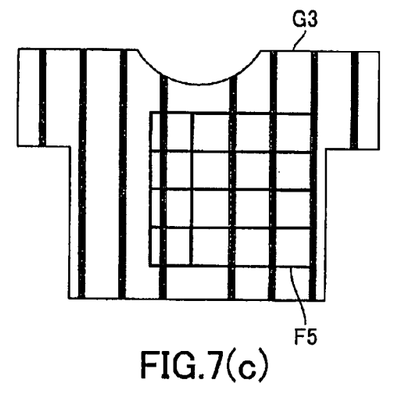
FIG. 7(c) is a schematic view showing a conventional filter with an original image.
Figure 7D:
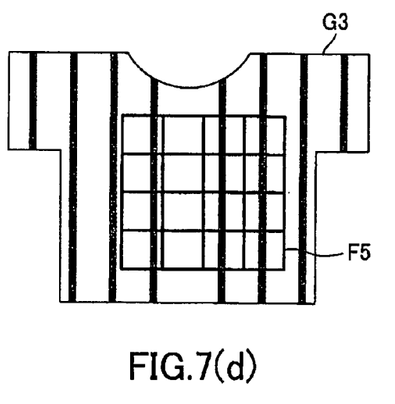
FIG. 7(d) is a schematic view showing the conventional filter in FIG. 7(c) slightly displaced from the position of FIG. 7(c)

FIGS. 7(c) and 7(d) shows an original image G3 with vertical strips and a filter F5 with filter coefficients in a lattice-like arrangement. In FIG. 7(c), straight lines of the filter coefficients coincide with the Stripes of the original image G3. In FIG. 7(d), the filter F5 is slightly moved from the position of FIG. 7(c), and the straight lines of the filter coefficients are displaced from the stripes of the original image G3. In this case also, the average brightness in FIG. 7(c) and that in FIG. 7(d) calculated using the filter F5 may largely differ from each other.

If the average brightness obtained in slightly different positions in the substantially same area largely differ from each other due to linearly aligned filter coefficients, pseudo contour may be generated. This pseudo contour is linear and highly visible, causing the deterioration in image quality.

However, according to the present embodiment, the filter coefficients does not form a straight line, thereby preventing the occurrence of pseudo contour even when the original image includes linear patterns.

There may be a case in which an original image includes a curving line that coincides substantially with a curing line of filter coefficients. However, even if any curved pseudo contour is generated, such curved pseudo counter does not come into notices easily, so that image quality is less likely to be degraded.

Further, according to the present embodiment, the filter coefficients are obtained through simple calculation using the Gaussian function and the logarithmic spiral functions. Therefore, it is unnecessary to prestore a plurality of filter coefficients in association with positions in a predetermined range.

While the invention has been described in detail with reference to the above embodiments thereof, it would be apparent to those skilled in the art that various changes and modifications may be made therein without departing from the spirit of the invention.

Figure 8:
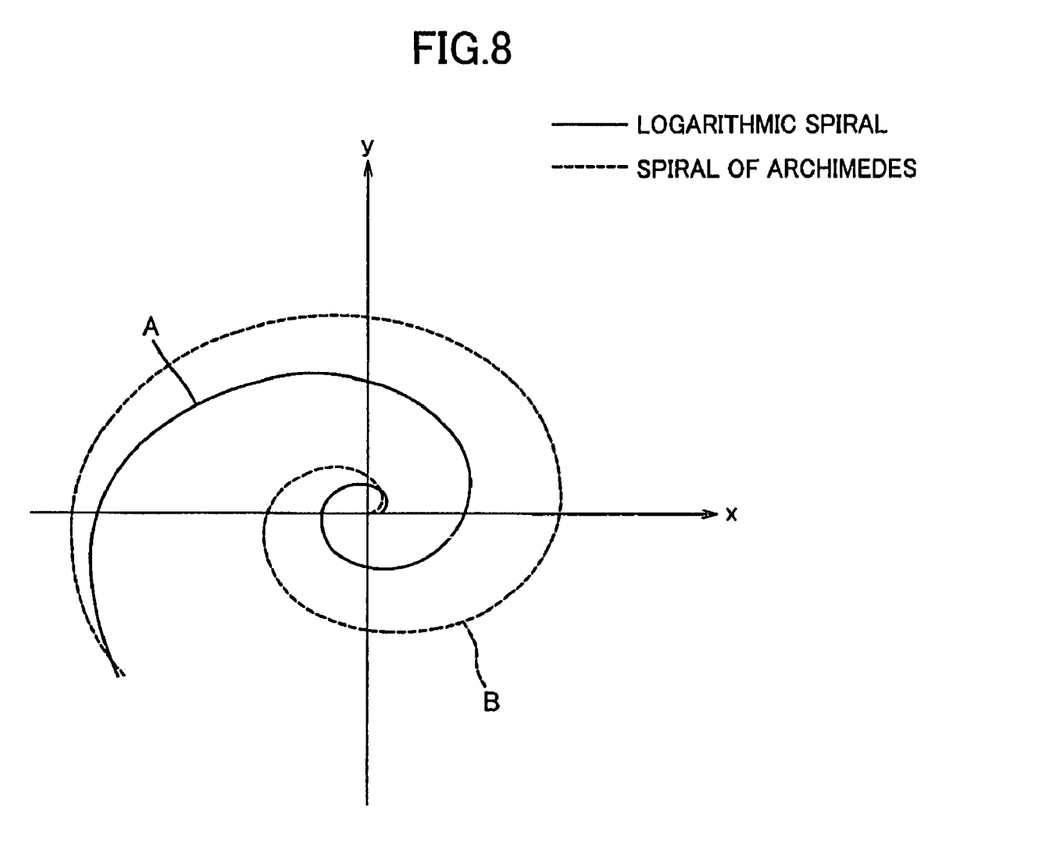
FIG. 8 shows the logarithmic spiral function curve and an Archimedes spiral curve.

For example, the positions of filter coefficients are set by using the logarithmic spiral functions in the above-described embodiment. However, different functions may be used. For example, it is possible to use an Archimedes spiral function, which is one of spiral functions. The Archimedes spiral function can be expressed by the following formula:

$r = \theta$ $x = r\cos(\theta)$ $y = r\sin(\theta)$

FIG. 8 shows the logarithmic spiral function curve A and an Archimedes spiral curve B. The Archimedes spiral curve B has the same distance to the other inner or outer curves with the same angle of deviation.

However, because the positions identified by the logarithmic spiral function are dense in a position near the subject pixel and are coarse in a position distant from the subject pixel, deterioration in image quality can be prevented more when the logarithmic spiral function is used than when Archimedes spiral function is used.

Figure 9A:
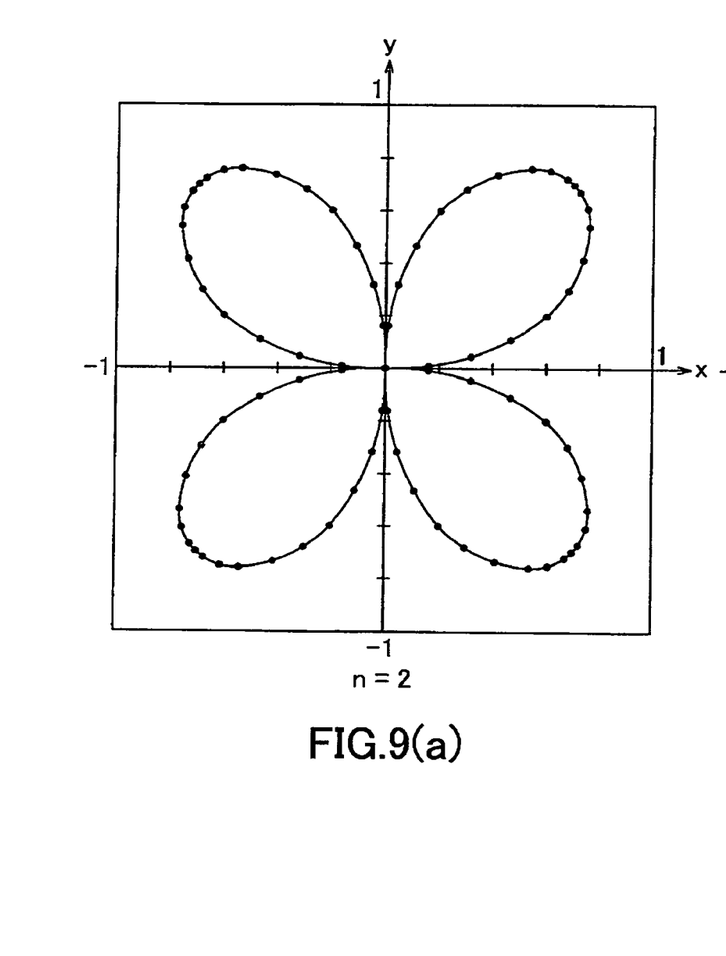
FIG. 9(a) shows a folium function curve when n=2.
Figure 9B:
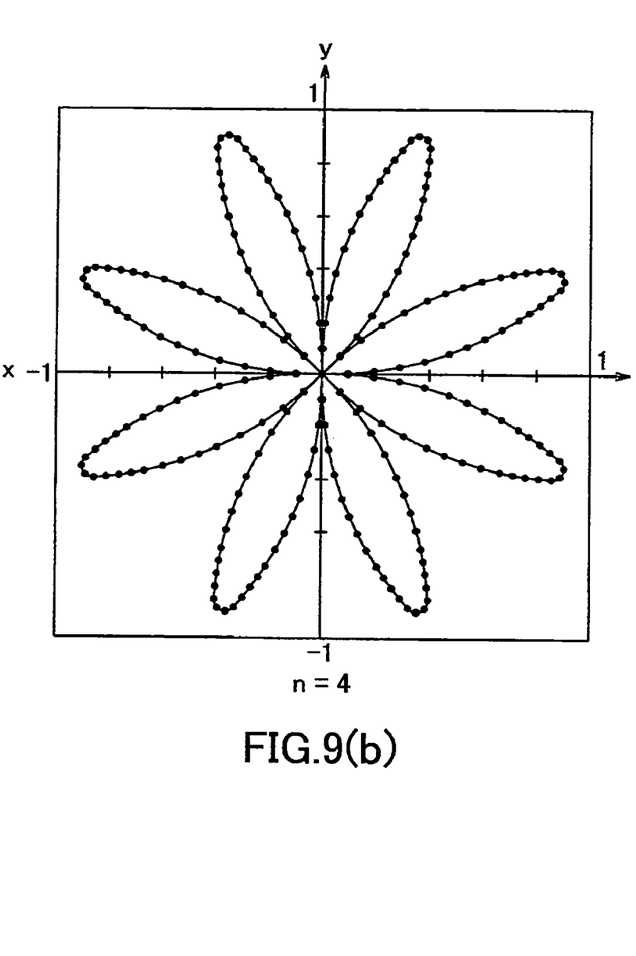
FIG. 9(b) shows a folium function curve when n=4.

It is also possible to use a folium function instead of a spiral function. The folium function is expressed by the following formula:

$r = \sin(n \times \theta)$ $x = r\cos(\theta)$ $y = r\sin(\theta)$

FIG. 9(a) shows a folium function curve when n=2, and FIG. 9(b) shows a folium function curve when n=4. These folium function curves are obtained by varying θ from 0 to 360 degrees.

Figure 5:
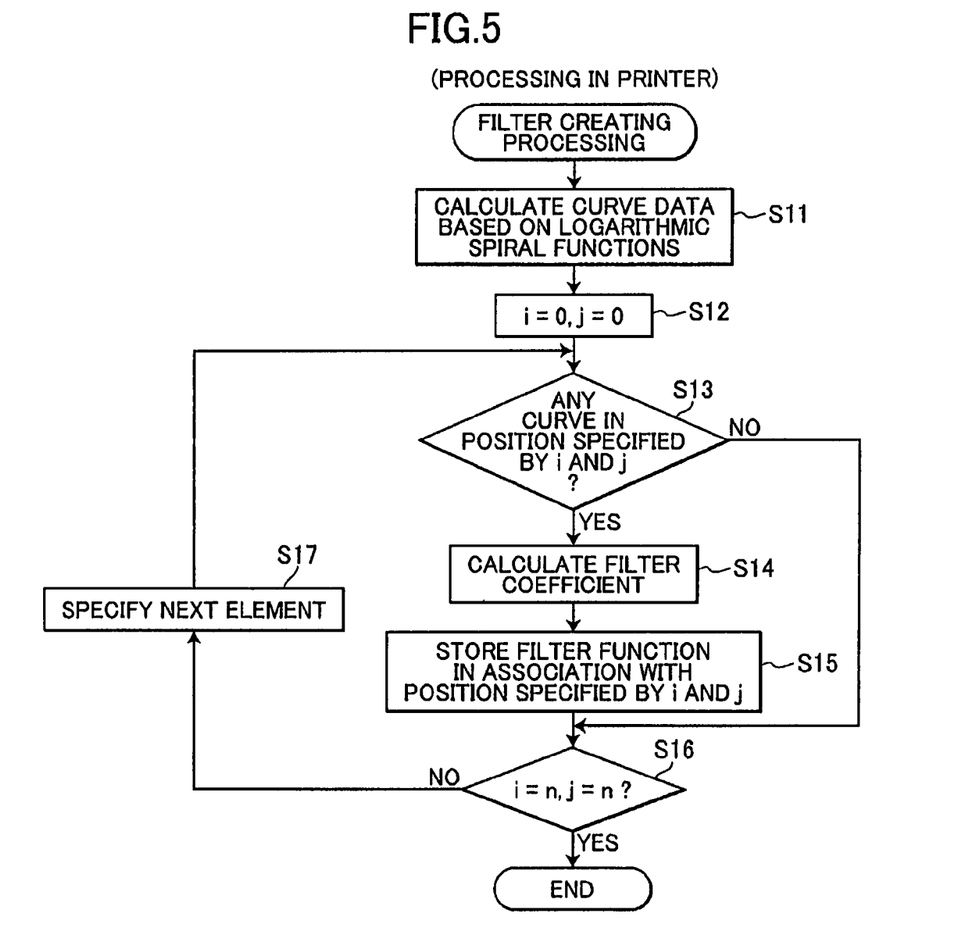
FIG. 5 is a flowchart representing a filter creating processing executed in Retinex processing shown in FIG. 4.
Figure 6:
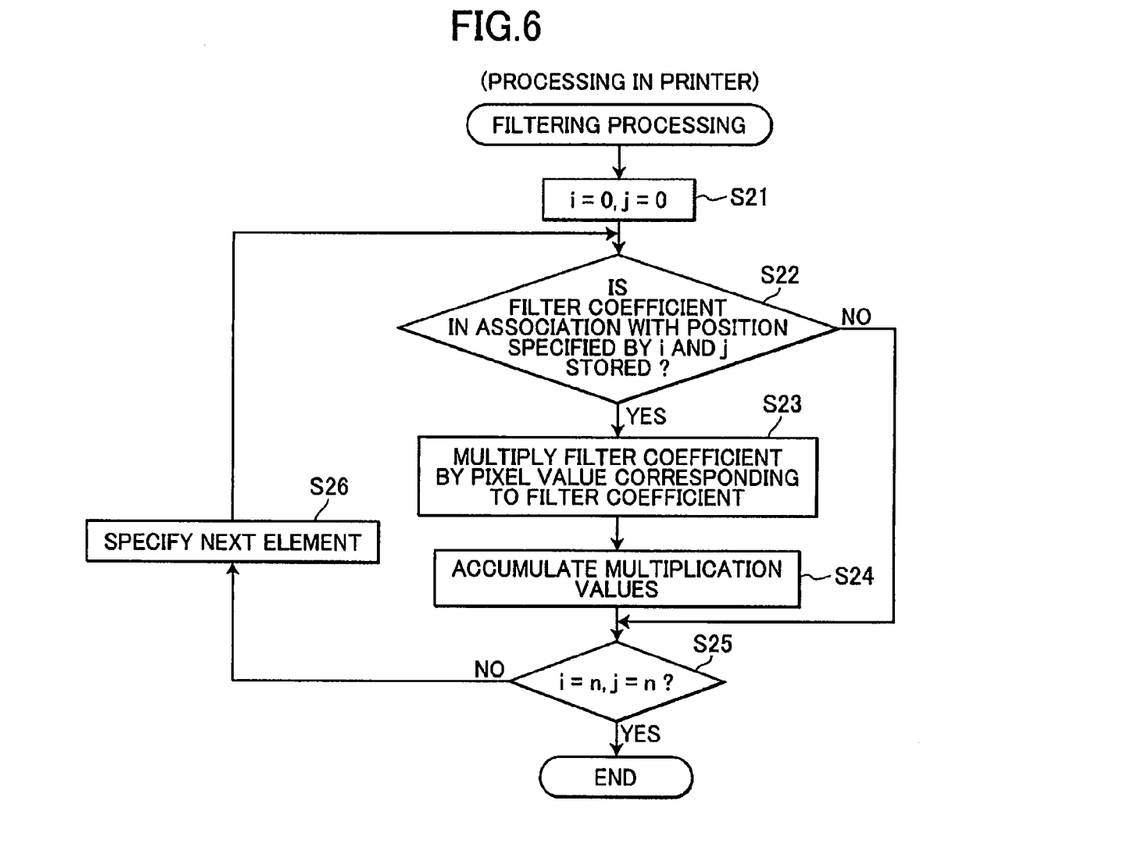
FIG. 6 is a flowchart representing a filtering processing executed in Retinex processing shown in FIG. 4.

A filter may be created according to the filter creating processing shown in FIG. 5, using the folium function. However, it is also possible to regulate positions of filter coefficients to positions indicated by dots in FIG. 9(a) or 9(b), which are at angles obtained by dividing 360 degrees by a predetermined number (for example, 200).

Moreover, it is also possible to use a random function to specify positions of filter coefficients. Since straight lines and curving lines are seldom formed in random positions, the generation of pseudo contour can be prevented to prevent the deterioration in image quality.

Figure 10A:
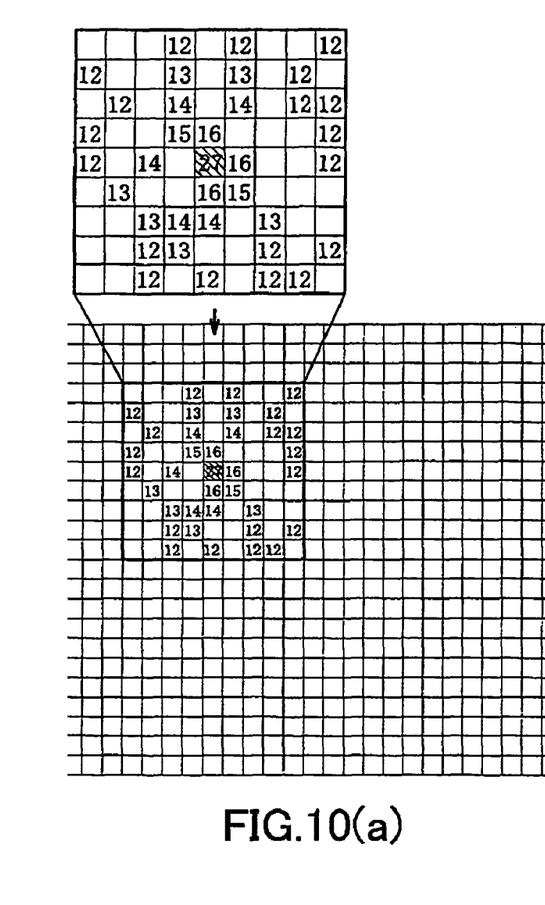
FIG. 10(a) is a schematic view showing a filter created by a random function where filter coefficients exist with an equal probability in an area.

For example, using a random function of M system, one of values of 0 to 99 is set for each of n×n elements in the surrounding area (duplication may be permitted or unpermitted). Then, it is determined that a filter coefficient exists for an element having a value equal to or greater than 50 and that no filter coefficient exists for an element having a value less than 50. As a result, a filter as shown in FIG. 10(a) is obtained. In this case, filter coefficients exist with an equal probability in the entire filter area.

Figure 10B:
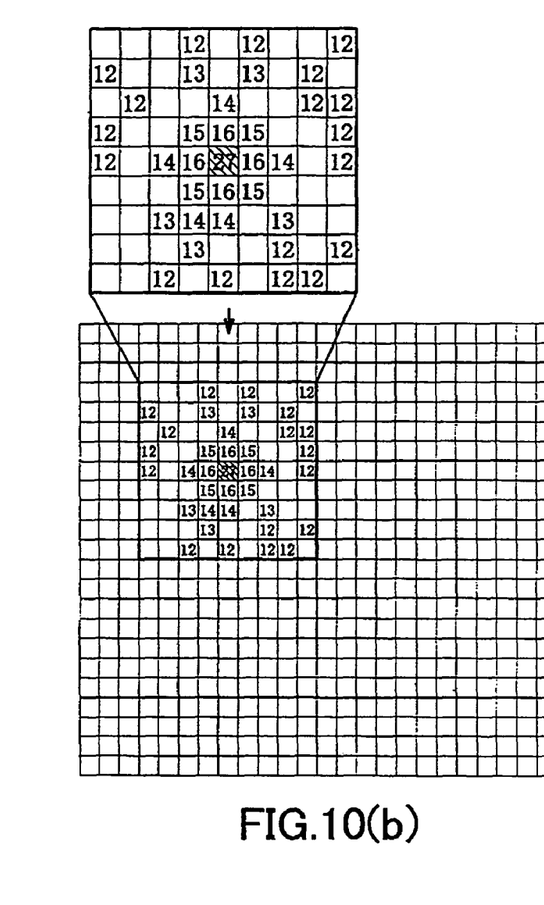
FIG. 10(b) is a schematic view showing a filter created by a random function where the probability of existence of a filter coefficient is higher in a position nearer to a subject pixel.

Alternatively, it may be determined that a filter coefficient exists for an element having a value equal to or greater than 20 in an inner area adjacent to the subject pixel, that a filter coefficient exists for an element having a value equal to or greater than 40 in an area around the inner area, and that a filter coefficient exists for an element having a value equal to or greater than 60 in an outer area. In this case, as shown in FIG. 10(b), the probability with which a filter coefficient exists is set higher as a position comes closer to the subject pixel. By setting more filter coefficients in the vicinity of the subject pixel, the deterioration in image quality can be prevented more efficiently.

In the above-described embodiment, the RGB system is employed as a color display system. However, the invention may be applied to other color display systems, such as a Lab system and a Ycc system. When brightness and color components are divided from each other as in the Lab system and the Ycc system, the invention may be applied only to L* (brightness).

In the above-described embodiment, filter coefficients are obtained through calculations using a function. However, a filter capable of suppressing the deterioration in image quality may be generated in advance according to the size and quality of frequently used images and stored in a memory, and a filtering processing may be executed using filter coefficients of the stored filter.

Further, in the above description, filter coefficients are obtained using the Gaussian function and the spiral function or using the Gaussian function and the random function. However, filter coefficients may be stored in a storage device, such as the ROM 12, in advance in correspondence with the positions in an area of the filter, and the convolution operation may be performed using the filter coefficients.

In the above-described embodiment, the image processing program is executed by the CPU 11 of the printer 1. However, the image processing program may be loaded as application program into a personal computer and executed by a CPU of the personal computer.

As Retinex processing, Single Scale Retinex (SSR) processing for executing a filtering processing once and Multi Scale Retinex (MSR) processing for executing a filtering processing a plurality of times are known.

Generally, in MSR processing, filter coefficients are obtained through calculations while varying one polar coordinate function and such parameters as Gaussian function, and thus a peripheral average luminance value composed of a plurality of scales is obtained, thereby enabling a correction to more natural colors.

In the above-described embodiment, SSR processing is employed as Retinex processing. However, the invention can also be applied to MMR processing, since a plurality of filters used in this case differs only in the parameters of the Gaussian function.

In the above-described embodiment, Retinex processing is executed by the CPU 11. However, Retinex processing may be executed by a Digital Signal Processor (DSP), which can execute the processing at a higher speed.

What is claimed is:

1. A non-transitory computer readable storage medium storing a set of program instructions executable on a computer and usable for controlling the computer to execute Retinex processing, instructions comprising:

performing convolution operation between a plurality of filter coefficients of a filter and density values of pixels of an original image corresponding to positions of the filter coefficients, wherein the positions of the filter coefficients of the filter have been set based on a polar coordinate function having an origin located at a position corresponding to a subject pixel of the original image and exist within a predetermined area corresponding to an area around the subject pixel, and the polar coordinate function is one of a spiral function, a logarithmic spiral function, an Archimedes spiral function, and a folium curve function.

2. The non-transitory computer readable storage medium according to claim 1, wherein instructions further comprise obtaining the filter coefficients based on a filter function and the polar coordinate function, the filter function being for calculating the filter coefficients.

3. The non-transitory computer readable storage medium according to claim 1, wherein the polar coordinate function is a spiral function.

4. The non-transitory computer readable storage medium according to claim 3, wherein the spiral function is a logarithmic spiral function.

5. The non-transitory computer readable storage medium according to claim 3, wherein the spiral function is Archimedes spiral function.

6. The non-transitory computer readable storage medium according to claim 3, wherein the filter coefficients have been set based on a plurality of spiral functions.

7. The non-transitory computer readable storage medium according to claim 1, wherein the polar coordinate function is a folium curve function.

8. A data processing device that executes Retinex processing, comprising:

a calculation unit that performs convolution operation between a plurality of filter coefficients of a filter and density values of pixels of an original image corresponding to positions of the filter coefficients, wherein the position of the filter coefficients of the filter have been set based on a polar coordinate function having an origin located at a position corresponding to a subject pixel of the original image and exist within a predetermined area corresponding to an area around the subject pixel, and the polar coordinate function is one of a spiral function, a logarithmic spiral function, an Archimedes spiral function, and a folium curve function.

9. The data processing device according to claim 8, further comprising an obtaining unit that obtains the filter coefficients based on a filter function and the polar coordinate function, the filter function being for calculating the filter coefficients.

10. The data processing device according to claim 8, wherein the polar coordinate function is a spiral function.

11. The data processing device according to claim 10, wherein the spiral function is a logarithmic spiral function.

12. The data processing device according to claim 10, wherein the spiral function is Archimedes spiral function.

13. The data processing device according to claim 10, wherein the filter coefficients have been set based on a plurality of spiral functions.

14. The data processing device according to claim 8, wherein the polar coordinate function is a folium curve function.

* * * * *